United States Patent Office 3,023,252
Patented Feb. 27, 1962

3,023,252
CALCIUM TRIMETHYLOLPHENATE
George A. Senior, Jr., Bloomfield, N.J., assignor to Union Carbide Corporation, a corporation of New York
No Drawing. Filed Dec. 29, 1958, Ser. No. 783,099
8 Claims. (Cl. 260—621)

This invention relates to a method for the preparation of calcium 2,4,6-trimethylolphenate.

Alkaline salts of 2,4,6-trimethylolphenol, such as the sodium trimethylolphenate and barium trimethylolphenate are known. Martin, U.S. 2,579,329, has described such a process for producing the sodium and barium salts, by the reaction of phenol, formaldehyde, and sodium or barium hydroxide. Attempts to make the corresponding calcium, potassium, or strontium salts, were, however, unsuccessful. Martin states that only the sodium and barium hydroxides are operable in his invention. The failure of the calcium, strontium, or potassium hydroxides to function as the other two is unexplained other than by conjecture. Martin mentions that his unsuccessful attempts to secure the calcium trimethylolphenate in recoverable form were possibly caused by the presence of mono- and di-methylolphenate salts, rendering it impossible to separate out any calcium trimethylolphenate if it actually was present. This inability of the calcium salt to follow the expected scheme of similar materials has also deterred other researchers in this field from preparing the calcium 2,4,6-trimethylolphenate, although Martin has theorized that it could exist.

In copending application Ser. No. 640,350, filed February 15, 1957, now U.S. Patent No. 2,889,373, by C. Y. Meyers, there is described a method for the preparation of the calcium 2,4,6-trimethylolphenate by the carefully controlled methylolation reaction in an aqueous medium of formaldehyde and calcium phenate, the latter of which can be formed in situ by the controlled reaction of calcium oxide or hydroxide and phenol.

The calcium trimethylolphenate can be recovered from the aqueous solution in that process by the use of precipitation agents, such as low molecular weight water-soluble solvents in which the calcium trimethylolphenate is insoluble, for example aliphatic alcohols, ketones, glycols, glycol diethers and the like. However, such a process is economically unfeasible because of the large amounts of such solvents necessary to precipitate the product, particularly from dilute aqueous solutions. Likewise there are necessary filtration or centrifugation steps as well as drying of the solid product under vacuum to avoid injury to the heat sensitive and highly reactive calcium trimethylolphenate.

It is also possible in that process to recover the calcium trimethylolphenate by evaporation in vacuo, under conditions so as to prevent significant resinification of the product. Inasmuch as there are three functional methylol groups on the product which readily react or self-condense, extreme care must be taken in the evaporation to prevent all undesirable reactions. Generally, temperatures above 65° C. cannot be tolerated because of the condensation and resinification of the product. Hence, high vacuum is necessary in that process to keep the temperature down to less than 50°–55° C. After the solidification and/or crystallization of the solid product, a great deal of care is necessary to prevent localized overheating of the solid calcium trimethylolphenate in order to drive off the last traces of water. Because of the highly reactive nature of the solid calcium salt, particularly when moist, this recovery step is far from being commercially attractive to produce solid crystalline calcium 2,4,6-trimethylolphenate of even acceptable quality.

According to the present invention, however, I have now discovered a commercially practicable way to recover substantially pure crystalline calcium 2,4,6-trimethylolphenate without suffering with self-condensation of calcium 2,4,6-trimethylolphenate and without the need for solvents or high vacuum drying techniques. The process of the instant invention includes the steps of feeding an aqueous solution of the calcium 2,4,6-trimethylolphenate to a high temperature flash evaporation apparatus operated at high gas temperatures, even at temperatures as high as 700° F.

The ability to isolate good quality, solid calcium 2,4,6-trimethylolphenate from aqueous solutions by such a high temperature process without suffering self-condensation and resinification is particularly surprising in view of the fact that trimethylolphenol itself, which is more stable than are its alkaline salts, cannot be recovered in solid form from an aqueous solution by such a procedure. Many efforts using a wide variety of temperatures, air-to-solution flow ratios and the like yielded only sticky, oily and putty-like deposits, but did not in any case yield any solid crystalline trimethylolphenol. Such would normally be considered the best which could be obtainable with the calcium trimethylolphenate since it is more reactive and heat sensitive than is trimethylolphenol.

Why this particular phenomenon exists only with calcium trimethylolphenate is unexplained. Even without a satisfactory explanation however, the process does operate, yielding an unresinified product of a quality often superior to that obtainable by the solvent precipitation or vacuum evaporation techniques, and in a substantially quantitative yield.

The process can be best described by way of reference to a preferred embodiment of carrying out the invention, although other embodiments and alterations in the process will be obvious to those skilled in the art. In this preferred embodiment, a gas, conveniently air, is drawn through the system by a blower. This gas is heated as it passes through a furnace or other suitable heating device and its temperature is controlled by the heat input and the amount of unheated gas admitted through an external damper for mixing in amounts of fresh air. The feed gas streams pass through a duct to the drying chamber through openings located to insure adequate mixing of the hot air stream with the output of an atomizer, which can be a spray head or centrifugal disk. The atomizer is fed with the aqueous calcium trimethylolphenate solution from a suitable storage tank through a connecting pipe or hose either by gravity feed or under pressure.

The atomized calcium trimethylolphenate solution droplets or mist contacts the hot gas in the chamber and is dried almost instantaneously. At a lower point in the chamber, cold air ports may be used to admit cool air to the chamber during operation, if the exit temperature of the warm air stream and solid calcium trimethylolphenate is too high. The dry powder, warm gas and water vapor move out of the chamber through a duct and into a centrifugal separator or other suitable separating device in which the heavier product particles separate from the gas and drop into the collector. The warm gas and water vapor leave the separator through the exit duct and are exhausted through the vent by a blower.

Various interrelated factors determine the rate of feed for the satisfactory flash evaporative drying of calcium trimethylolphenate, such as temperature of the feed, concentration of the feed solution and temperature of the drying gas. The maximum gas temperature for drying depends on the total residence time in the chamber which itself depends on the size and the gas velocity through the chamber.

Gas temperatures as high as 700° F. can be employed in this method. I particularly prefer to have the drying gas at a temperature between 300° F. and 625° F. and more preferably between about 300° and 450° F. At temperatures above about 625° F. some discoloration of the product is noted which progresses to evident deterioration of the product at temperatures above 700° F. While temperatures less than 300° F. can be employed, they are not desirable since the drying rate is exceedingly slow and the residence time in the drying chamber would be quite long. Also, it would be necessary to preheat the feed solution when operating at such low inlet drying gas temperature.

I have found that the feed solution in this process can be preheated to a moderate degree to reduce the size of the drying chamber and residence time in the chamber. It also permits more concentrated feed solutions to be handled. If preheat temperatures of the feed solution over 120° F. are desired, it is necessary that the preheating be quick or instantaneous to minimize the length of the time that the solution is at such temperatures. Otherwise serious deterioration of the product will be incurred. This can be readily accomplished by a fast or instantaneous heater in the feed solution line just prior to the entrance or spray nozzle in the drying vessel.

The feed solution can contain as little as 2–3% of calcium trimethylolphenate solids content or as much as 70% or more solids by weight, depending on the operating conditions, the amount of water employed in the process of making the calcium trimethylolphenate, and whether or not it has been concentrated in vacuo. I have found that best results are secured when the feed solution contains from about 25 to 55 percent by weight of solids, as determined by evaporating to dryness a weighed sample of the feed solution at 275° F.

The viscosity of solutions having a solids content above 55 percent somewhat limits their applications, although preheating of the feed solution permits operation at solids content as high as 70% or more. With the very dilute solutions, concentration in vacuo at temperatures below about 120°–150° F. is very desirable, so as to reduce the size of the drying chamber or the temperature of the drying gas.

Temperature of the feed solutions is preferably between 40° and 150° F. and more preferably between 50° and 110° F., although with an instantaneous preheater, temperatures of higher than 150° F. can be employed.

The exit temperature of the moisture-laden drying gas carrying the dry calcium trimethylolphenate should preferably be below 170° F. so as to prevent resinification or other deleterious effects on the product. This is readily controlled by the inlet gas temperature, residence time in the drying vessel, concentration of solids in the feed and the amount of cooling gases introduced into the vessel. The introduction of cooling gases through pores in the drying chamber facilitates the cooling of dry powdered product. As much as 75% of the gas flow through the chamber may be product cooling gas. It may be introduced along the sides of the chamber or at other suitable places in order to sweep the powdered product along and keep it from clinging to or building up in the chamber, while also serving to cool the product down to less than 170° F.

The product is recovered from the exit gas stream by any suitable means such as by cyclone filter, bag filters or other solids-gas separation means. The product is generally light and fluffy and quite pure, as is evident from the high melting point of the trimethylolphenol prepared therefrom, i.e., a melting point of 86–87° C., whereas the highest melting point of substantially pure trimethylolphenol heretofore reported has been 84–85° C.

In the following examples, a spray drying chamber measuring about 3 x 4 feet having a 2 inch centrifugal disc (type C–SE) turning at 30,000 r.p.m. driven by 76 p.s.i.g. air pressure was employed. The chamber was equipped with two 1 inch x 3 inch cold air ports in the lower section for cooling the product gas stream. These ports were operated open.

The calcium trimethylolphenate solution employed in these examples was prepared in the following manner, all parts being by weight. A charge consisting of 100 parts of phenol, 300 parts water, 258 parts of a 37% formalin solution was added to a reaction vessel and maintained at about 20° C. while slowly adding 42 parts of hydrated lime. At the completion of the addition of the lime, the contents of the vessel were heated to 30° C. and held for 18 hours. At the completion of this time, the free formaldehyde content was less than 2%, and the contents cooled to 20° C. and 7 parts of Hyflo Super-Cel (filter aid) were mixed in. The resultant mixture was then filtered through a Sparkler filter precoated with the filter aid at 0.1 pound per square foot of filter surface.

The resultant solution was a clear red liquid solution (solids content of 30–31%) of calcium 2,4,6-trimethylolphenate and water. The solution was concentrated in part to a solids content of 34.7 percent by weight and in part to a solids content of 46.8 percent by weight at 40°–45° C. at 50 mm. Hg pressure.

The following table sets forth the conditions under which the examples were carried out. The procedure employed was the preferred procedure hereinbefore set forth.

*Table I*

| Example | 1 | 2 | 3 | 4 | 5 | 6 |
|---|---|---|---|---|---|---|
| Percent solids of feed solution | 46.8 | 46.8 | 46.8 | 46.8 | 34.7 | 34.7 |
| Feed temperature, °F | 75 | 75 | 75 | 75 | 75 | 75 |
| Average feed rate (volumes/min.) | 60 | 90 | 120 | 60 | 90 | 40 |
| Total feed run (volume) | 960 | 1,000 | 1,020 | 1,000 | 960 | 1,020 |
| Entering air temp., °F | 400 | 500 | 600 | 400 | 500 | 400 |
| Outlet air temp., °F | 145 | 160 | 168 | 145 | 150 | 147 |
| Collector product, parts | 514 | 425 | 348 | 628 | 331 | 468 |
| Remaining in chamber, parts | 104 | 223 | 325 | None | None | None |
| Total product, parts | 618 | 648 | 673 | 628 | 331 | 468 |
| Percent recovery | 105 | 106 | 92 | 102 | 85 | 96 |

The products of Examples 3, 4, 5 and 6 were examined for quality by neutralizing the calcium salt with carbon dioxide to form trimethylolphenol and melting points checked. The melting points of the trimethylolphenol obtained from these samples were 86–87° C., indicating a very high purity of calcium 2,4,6-trimethylolphenate.

What is claimed is:

1. A process for the preparation of crystalline calcium 2,4,6-trimethylolphenate which includes the steps of atomizing an aqueous solution of calcium 2,4,6-trimethylolphenate in a heated inert gas stream at a temperature sufficiently high to flash evaporate the water from said solution but below that causing resinification of the solid calcium 2,4,6-trimethylolphenate formed and maintaining the solid calcium trimethylolphenate formed at a temperature less than that causing resinification of such product in the exit gas stream.

2. A process as described in claim 1 wherein the heated gas stream is between 300° F. and 625° F.

3. A process as described in claim 1 wherein the heated gas is air.

4. A process for the preparation of crystalline calcium 2,4,6-trimethylolphenate which includes the steps of feeding an aqueous solution of calcium 2,4,6-trimethylolphenate to one end of a vessel, atomizing therein the said solution in a heated inert gas stream maintained at a temperature between about 300° F. and 700° F., flash evaporating the water from said solution while maintaining the solid calcium 2,4,6-trimethylolphenate in the heated gas stream at a temperature less than that causing resinification of the calcium 2,4,6-trimethylolphenate, and removing the solid calcium 2,4,6-trimethylolphenate from the vessel.

5. A process as described in claim 4 wherein the solid calcium 2,4,6-trimethylolphenate is removed from the vessel in the heated gas stream at a temperature less than 170° F.

6. A process as described in claim 4 wherein the heated gas stream is air at a temperature below 450° F.

7. A process for the preparation of solid calcium 2,4,6- trimethylolphenate which includes the steps of atomizing an aqueous solution of calcium 2,4,6-trimethylolphenol at a temperature maintained between 40° and 150° F. in a vessel in a heated air stream which is maintained at a temperature between about 300° F. and 625° F., flash evaporating the water from the said solution while admitting sufficient cold air to the said vessel so that the exit air stream carrying the dry calcium 2,4,6-trimethylolphenate is kept at a temperature below about 170° F., and removing the solid calcium 2,4,6-trimethylolphenate from the said air stream.

8. The process as described in claim 7 wherein the solids content of the aqueous solution is between about 25 to 55 percent by weight.

References Cited in the file of this patent

UNITED STATES PATENTS

| | | |
|---|---|---|
| 1,735,356 | Neff | Nov. 12, 1929 |
| 1,900,517 | Pasternack et al. | Mar. 7, 1933 |
| 2,091,183 | Murray et al. | Aug. 24, 1937 |
| 2,579,329 | Martin | Dec. 18, 1951 |
| 2,889,373 | Meyers | June 2, 1959 |